United States Patent Office 3,293,213
Patented Dec. 20, 1966

3,293,213
TERPOLYMERIC RESINS FROM BIS-(p-HY-DROXYCUMYL)BENZENE
Oliver A. Barton, Florham Park, and Enid Schwartz, New Providence, N.J., assignors to Allied Chemical Corporation, New York, N.Y., a corporation of New York
No Drawing. Filed July 23, 1962, Ser. No. 211,863
14 Claims. (Cl. 260—47)

This invention relates to new terpolymeric resins and to a process for preparation thereof.

More particularly, this invention relates to production of new terpolymeric resins by the interaction of 1,4-bis(p-hydroxycumyl)benzene or 1,3-bis(p-hydroxycumyl)benzene and an epoxide resin prepared by the reaction of 2,2-bis(p-hydroxyphenyl)propane and epichlorohydrin.

Epoxide resins and processes for their preparation by the reaction of dihydric phenols and epichlorohydrin are well known in the prior art. Such resins vary in their physical state from liquids to semi-solids to solids and are generally cured to a thermoset condition by heating in the presence of chemical hardening agents. Resins produced by such curing have a high molecular weight which render them particularly suitable for use in coatings, encapsulation and as laminates. These resins, however, generally possess modest physical properties in regard to durability in hardness, flexibility, and, in particular, are quite rigid as manifested by their low impact resistance. As a result, the resins are inclined to brittleness and chipping, thus rendering them inapplicable for many uses.

In order to overcome these aforementioned disadvantages, it has been the practice to further react the epoxide resins, prior to curing, with secondary polymeric materials which possess functional groups which are reactive with hydroxyl, epoxide or other reactive groups present in the epoxide resin. Alternatively, the cured resins have been impregnated with a plasticizing agent for the purpose of reducing inherent brittleness and rigidity.

However, none of the prior art modifying procedures have been capable of producing a resinous composition which possesses sufficient durability in hardness and resistance to chemical attack while simultaneously maintaining a workable degree of elasticity and flexibility.

Accordingly, it is a principal object of this invention to provide terpolymeric resins which possess a greater degree of durability in hardness, chemical inertness, flexibility and elasticity.

It is a further object of the present invention to provide a process for the preparation of these terpolymeric resins.

In accordance with the present invention, terpolymeric epoxide resins may be prepared by the interaction of 1,4-bis(p-hydroxycumyl)benzene or 1,3-bis(p-hydroxycumyl)benzene with an epoxide resin prepared from 2,2-bis(p-hydroxyphenyl)propane and epichlorohydrin.

More particularly, the terpolymeric epoxide resins may be prepared by heating at temperature of about 150° to 250° C. a reaction mixture comprising an epoxide resin prepared by reaction of 2,2-bis(p-hydroxyphenyl)propane and epichlorohydrin and 1,4-bis(p-hydroxycumyl)benzene or 1,3-bis(p-hydroxycumyl)benzene, in molar ratio of about 0.5 to 5 mols of 1,4-bis(p-hydroxycumyl)benzene or 1,3-bis(p-hydroxycumyl)benzene per mol of epoxide resin.

The epoxide resin used as reactant may be prepared by conventional processes which comprise reacting 2,2-bis(p-hydroxyphenyl)propane, hereinafter referred to as bisphenol-A, and epichlorohydrin. The resin is generally represented by the following structural formula

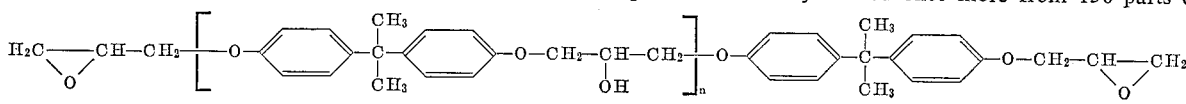

wherein n ranges from about 2 to 25.

1,4-bis(p-hydroxycumyl)benzene may be represented as

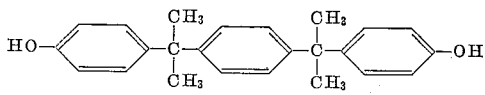

1,3-bis(p-hydroxycumyl)benzene may be represented as

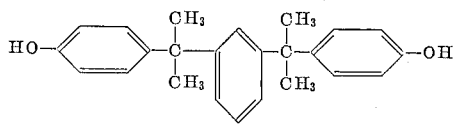

Copending application Serial No. 140,221 of Broderick et al., filed September 25, 1961, discloses and claims 1,4-bis(p-hydroxycumyl)benzene and 1,3-bis(p-hydroxycumyl)benzene and process for their production which comprises reacting phenol with 1,4-diisopropylbenzene-α,α'-diol (hereafter referred to as the dicarbinol of 1,4-diisopropylbenzene) or 1,3-diisopropylbenzene-α,α'-diol (hereafter referred to as the dicarbinol of 1,3-diisopropylbenzene). The following examples, taken from said copending application (in which they appear as Examples 2 and 3), are illustrative of the process for production of said 1,4- and 1,3-bis(p-hydroxycumyl) benzenes.

*Example A*

A mixture of 5 parts of the dicarbinol of 1,4-diisopropyl benzene and 45 parts of phenol was heated in a vessel provided with a stirrer to temperature of 75° C. Gaseous hydrogen chloride was then added over a 5-minute period until saturation occurred, the temperature rising to 98° C. The temperature then slowly decreased and was maintained at 70° to 80° C. for a period of 30 minutes. The product was allowed to cool and remain for several hours as a solid. The solid product was then liquefied by heating it to 70° C., and about 2000 parts of hot water were added with stirring. Upon cooling to room temperature, a semi-solid product was filtered off which was essentially free of unreacted phenol. After washing the product with water, it was recrystallized from methanol and then from acetone to give a white crystalline solid comprising 1,4-bis(p-hydroxycumyl)benzene.

*Example B*

135 parts of phenol were heated to temperature of about 45° to 50° C. for a period of 1 hour in a vessel provided with a stirrer. The phenol was then saturated by the continuous addition of gaseous hydrogen chloride. The temperature was increased to about 55° to 60° C., and 30 parts of the dicarbinol of 1,3-diisopropyl benzene were added with constant stirring over a period of 10 minutes. After addition of the dicarbinol, the continuous stirring and gaseous hydrogen chloride addition were maintained at temperature of 55° to 60° C. for one hour. The resulting product was then slurried with 10 times its volume of warm (60° C.) water and was agitated for several minutes. A two-phase system resulted and the upper aqueous layer was removed by decantation and discarded. The remaining organic layer was slurried with 10 times its volume of warm water. The resulting reaction product was then filtered off and washed several times with water to effect removal of residual phenol.

The solid product was then dissolved in 113 parts of toluene at 75° C., filtered to remove solid impurities, cooled to about 30° C. and then filtered again. The product was recrystallized once more from 150 parts of toluene and dried in a rotary steam drier under vacuum condtions to give 25.5 parts of a white crystalline solid having a melting point of about 138° to 140° C., identified as 1,3-bis(p-hydroxycumyl)benzene.

The molecular weight of the epichlorohydrin-bisphenol-A epoxide resin may range from about 340 to 2000. Desired molecular weight resin is obtained by controlling the reaction conditions of the process.

For example, the molar ratio of epichlorohydrin to bisphenol-A inversely regulates the molecular weight of the resin. More specifically, an epoxide resin having a molecular weight of about 340 to 450 is obtained when about 20 to 5 mols of epichlorohydrin are reacted with 1 mol of bisphenol-A, as compared to molecular weight of about 1000 to 5000 when a molar ratio of about 3 to 1.7:1 is employed.

It is understood that molecular growth inhibitors and chain terminators may also be successfully employed in controlling molecular weight of the epichlorohydrin-bisphenol-A epoxide resin.

According to the present invention, superior properties of durability in hardness may be imparted to these epoxide resins with a significant increase in flexibility and elasticity by admixing 1,4-dis(p-hydroxycumyl)benzene or 1,3-bis-(p-hydroxycumyl)benzene and the resin at temperatures of about 150° to 250° C., in molar ratio of about 0.5 to 5 mols of 1,4-bis(p-hydroxycumyl)benzene or 1,3-bis(p-hydroxycumyl)benzene per mol of epoxide resin, prior to the implementation of any curing procedure. The resulting chemical structure of the modified epoxide resins is dependent to a great degree upon the specific temperature and molar ratio employed. Generally, such resins are obtained as complex resinous mixtures containing one predominant structure.

The process of this invention is preferably carried out by admixing solid 1,4-bis(p-hydroxycumyl)benzene or 1,3-bis(p-hydroxycumyl)benzene and liquid epichlorohydrin-bisphenol-A epoxide resin at room temperature as a solid slurry and then warming the mixture with agitation to such temperature that the reaction mixture becomes a clear, homogeneous liquid. The temperature at which such homogeneity occurs is at least partially dependent upon the molar ratio of resin to 1,4-bis(p-hydroxycumyl)benzene or 1,3 - bis(p-hydroxycumyl)benzene. Molar ratios of not more than about 1 mol of 1,4-bis(p-hydroxycumyl)benzene or 1,3-bis(p-hydroxycumyl)benzene per mol of epoxide resin permit temperature as low as 150° C. to be used. Increasing quantities of 1,4-bis(p-hydroxycumyl)benzene or 1,3-bis(p-hydroxycumyl)benzene up to a molar ratio of about 5 mols of 1,4-bis (p-hydroxycumyl)benzene or 1,3-bis(p-hydroxycumyl)benzene to 1 mol of resin require minimum reaction temperature of about 175° to 180° C. Temperatures in excess of the minimum reaction temperature required for a fluid homogeneous system are preferred, and temperatures of about 180° to 220° C. have been found to be optimum.

If desired, high boiling solvents such as naphthalene, monochlorobenzene, dichlorobenzene, Decalin and 3,5-dichloro-1,4-dimethylbenzene may be used in the process. Use of such solvents is not preferred, however, since they tend to slow down the reaction by dilution.

The reaction temperature appears to control the ratio of phenolic versus alcoholic hydroxy groups which enter the reaction. In addition to a slower reaction rate at lower temperatures, a competitive reaction occurs between the alcoholic hydroxy groups of the resin and the more active phenolic hydroxy groups of the 1,4-bis(p-hydroxycumyl)benzene or 1,3-bis(p-hydroxycumyl)benzene for the epoxy groups of the resin. At higher temperatures, however, the reaction rate is considerably increased and the competition between the phenolic and alcoholic hydroxy groups is greatly diminished to a point where nearly 90 percent of the phenolic hydroxy groups have reacted. At both low and high temperatures some cross-linking occurs. At the higher temperatures less of the alcoholic hydroxy groups take part in the cross-linking due to the greater reactivity of the phenolic hydroxy groups. At the lower temperatures, however, both types of hydroxy groups take part in cross-linking.

The mode of admixture of the reactants is optional, and optimum results may be obtained whether the reactants are mixed first at room temperature and then heated to the required reaction temperature or whether one or the other of the reactants is first heated to the required reaction temperature and the other ingredient is then added.

Although molar ratios of 1,4-bis(p-hydroxycumyl)benzene or 1,3-bis(p-hydroxycumyl)benzene to the epichlorohydrin bisphenol-A epoxide resin may range from about 0.5 to 5:1, it is preferred not to have an excess of 1,4-bis(p-hydroxycumyl)benzene or 1,3-bis(p-hydroxycumyl)benzene over the resin since such excess is conducive to the preparation of terpolymeric resins wherein the terminal groups are primarily phenolic. Resins containing such terminal groups have the undesirable characteristic of being susceptible to chemical attack. Further, use of an excess of 1,4-bis(p-hydroxycumyl)benzene or 1,3-bis-(p-hydroxycumyl)benzene over resin results in obtainment of relatively unstable resin and necessitates removal of the unreacted 1,4-bis(p-hydroxycumyl)benzene or 1,3-bis(p-hydroxycumyl)benzene in order to render the resin more stable. The means by which this may be accomplished will be apparent to those skilled in the art. For example, conventional isolation procedures such as distillation, solvent extraction or further reaction of the 1,4-bis(p-hydroxycumyl)benzene or 1,3-bis(p-hydroxycumyl)benzene with epichlorohydrin have been successfully employed.

Consequently, it is preferred to employ molar ratios of 1,4-bis(p-hydroxycumyl)benzene or 1,3-bis(p-hydroxycumyl)benzene to the epichlorohydrin bisphenol-A resin in the range of about 0.5 to 2:1. By use of this range, the resulting terpolymeric resins terminate largely in epoxide groups.

The resulting terpolymeric resins may be cured to thermoset condition by the addition of conventional curing agents i.e., a polyfunctional curing agent such as diethylenetriamine, tolylene diisocyanate and phthalic acid. The quantity of curing agent may vary over a wide range, but it is preferably employed in amount of one chemical equivalent per chemical equivalent of the terminal end group of the terpolymeric resin.

The following Examples 1 to 6 are given for the purpose of illustrating the present invention. In the examples, the epoxide resin reactant, prepared from the reaction of bisphenol-A and epichlorohydrin, possessed a molecular weight of 384, specific gravity of 1.16, and a viscosity of 25° C. of 9500 centipoises. In the examples, parts are by weight.

*Example 1*

35.0 parts of the epoxide resin were admixed with 36.8 parts of 1,4-bis(p-hydroxycumyl)benzene in a resin pot and heated with constant agitation to temperature of 150° C. The reaction mixture was maintained at this temperature for a period of two hours, during which time aliquot samples were removed periodically to determine the epoxide equivalent of the resulting terpolymeric resin. Since the epoxide equivalent is equal to the number of grams of resin containing one gram equivalent of epoxide, increasing reaction rate produces resins possessing larger epoxide equivalents. The rates of reaction is thus illustrated by the data contained in Table I.

TABLE I

| Time, Hours | Epoxide Equivalent | Molecular Weight |
|---|---|---|
| 0.0 | 402 | 804 |
| 1.0 | 459 | 918 |
| 1.5 | 500 | 1,000 |
| 2.0 | 515 | 1,030 |

The terpolymeric resin was a clear, homogeneous resin soluble in acetone and dioxane. To 50 parts of a 30 percent by weight acetone solution of the resulting resin, 0.6 part of diethylenetriamine was added as curing agent. A film of 1.8 mils dried thickness was cast on bonderized steel and cured for a period of 20 minutes at temperature of 90° C.

*Example 2*

25.0 parts of the epoxide resin were heated to a temperature of 165° C. and then admixed with 45.0 parts of 1,4-bis(p-hydroxycumyl)benzene in a resin pot. The reaction mixture was constantly stirred and the reaction temperature maintained for a period of 5.5 hours during which time aliquot samples were removed in order to measure the reaction rate as in Example 1. Resulting data are contained in Table II.

TABLE II

| Time, Hours | Epoxide Equivalent | Molecular Weight |
|---|---|---|
| 0.0 | 556 | 1,112 |
| 1.0 | 690 | 1,380 |
| 1.5 | 752 | 1,504 |
| 2.0 | 900 | 1,800 |
| 2.5 | 1,058 | 2,116 |
| 3.0 | 1,370 | 2,740 |
| 4.0 | 2,020 | 4,040 |
| 5.0 | 2,778 | 5,556 |
| 5.5 | 4,346 | 8,692 |

The resulting terpolymeric resin was a clear, homogeneous resin soluble in acetone and dioxane. To 70 parts of a 15 percent by weight acetone solution, 0.04 part of diethylenetriamine was added. A film of 1.5 mils dried thickness was cast on bonderized steel and cured by heating for a period of 20 minutes at temperature of 93° C.

*Example 3*

A reaction mixture of 38.4 parts of the epoxide resin and 69.2 parts of 1,4-bis(p-hydroxycumyl)benzene was stirred and heated to temperature of 200° C. for a period of 3 hours. The resulting terpolymeric resin possessed an epoxide equivalent approaching infinity (molecular weight 15,000). To 5 parts of this resulting resin was added 0.1 part of tolylene diisocyanate as curing agent, followed by heating for a period of 30 minutes at temperature of 95° C.

*Example 4*

The terpolymeric resin produced by the process of Example 3 was alternatively cured by adding to 4 parts of the resin an additional amount of 1.6 parts of the epoxide resin and 0.18 part of diethylenetriamine in the presence of 22.4 parts of acetone as solvent.

*Example 5*

A reaction mixture of 76.8 parts of the epoxide resin and 34.6 parts of 1,4-bis(p-hydroxycumyl)benzene was continuously stirred at temperature of 200° C. for two hours. The resulting terpolymeric resin possessed an epoxide equivalent approaching infinity (molecular weight about 15,000). This resulting resin was cured by the addition of 0.18 part of diethylenetriamine, followed by baking at temperature of 95° C. for a period of 30 minutes.

*Example 6*

10.1 parts of the epoxide resin were admixed with 45.0 parts of 1,4-bis(p-hydroxycumyl)benzene in a resin pot and heated with constant stirring to temperature of 175° to 180° C., for a period of two hours. Once again, aliquot samples of the reaction mixture were removed and epoxide equivalents, as set forth in Table III, were determined.

TABLE III

| Time, Hours | Epoxide Equivalent | Molecular Weight |
|---|---|---|
| 0.0 | 1,176 | 2,352 |
| 1.0 | 2,272 | 4,544 |
| 2.0 | 4,500 | 9,000 |

The resulting terpolymeric resin contained predominantly phenolic end-groups due to the large excess molar ratio of 1,4-bis(p-hydroxycumyl)benzene to epoxide resin (5 to 1). The resin was a rigid mass which was rendered more pliable by the following procedures: 20 parts of terpolymeric resin was admixed with 44.4 parts of epichlorohydrin, 3.5 parts of sodium hydroxide and 1 part of water. The reaction mixture was heated for a period of 1 hour at temperature of 90° C. This process produced a terpolymeric resin wherein relatively all the terminal end-groups were epoxides. Purification and isolation of this resulting resin were accomplished by dissolving the terpolymeric resin in 125 parts of acetone, followed by filtration to remove resulting salts and recovery of the acetone by distillation. A clear, semi-solid terpolymeric resin having an epoxide equivalent of 300 (molecular weight about 600) was obtained and cured by the addition of 1.0 part of diethylenetriamine in the same manner as described in Example 2.

In the following Examples 7 and 8, terpolymeric resins were obtained by reacting bisphenol-A, as modifying agent, with epoxide resin prepared by the reaction of bisphenol-A and epichlorohydrin. This epoxide resin possessed a molecular weight of 445, specific gravity of 1.16, and a viscosity at 25° C. of 40,000 centipoises.

*Example 7*

31.92 parts of bisphenol-A were admixed with 26.88 parts of the epoxide resin and heated to temperature of 200° C. for a period of 3 hours under constant agitation. The resulting terpolymeric resin possessed an epoxide equivalent of 909 (molecular weight about 1818). 5 parts of this material were cured by the addition of 0.15 part of tolylene diisocyanate in the presence of 20 parts of acetone as solvent. A film of the resulting terpolymeric material was prepared by allowing 2 parts of the resulting mixture to remain upon a bonderized steel panel for a period of 0.5 hour at the end of which time the acetone present evaporated. The residue was then heated at temperature of 80° C. for a period of 3 hours.

*Example 8*

57.0 parts of bisphenol-A were admixed with 19.2 parts of the epoxide resin in a suitable reaction vessel, and heated with constant stirring to temperature of 175° to 180° C. over a period of 2 hours. Aliquot samples were periodically removed and the epoxide equivalents thereof were determined, as set forth in Table IV.

TABLE IV

| Time, Hours | Epoxide Equivalent | Molecular Weight |
|---|---|---|
| 0.0 | 772 | 1,544 |
| 1.0 | 980 | 1,960 |
| 2.0 | 1,351 | 2,702 |

The above terpolymeric material was further reacted with 55 parts of epichlorohydrin and 1 part of water in order to convert the terminal end-groups from phenolic to epoxide. The resulting reaction mixture was continually stirred and heated to temperature of 95° C. for a period of 0.5 hour. 11 parts of solid sodium hydroxide were then added to the reaction mixture in four equal portions at 0.25 hour intervals. Unreacted epichlorohydrin and water were removed from the reaction system by vacuum distillation. Tht resulting terpolymeric resin was then dissolved in toluene and filtered in order to remove resulting salts. After the removal of toluene by vacuum distillation, a clear yellow terpolymeric resin was obtained. Curing was accomplished by reacting 5 parts of the terpolymeric resin with 0.43 part of diethylenetriamine in the presence of 20 parts of acetone as solvent. A film was prepared on a bonderized steel panel followed by heating at temperature of 100° C. for a period of 1 hour.

The physical and chemical properties of the terpolymeric resins produced by Examples 1 to 6, as compared to those produced by Examples 7 and 8, are illustrated in Table V.

benzene with an epoxide resin prepared from the reaction of bisphenol-A and epichlorohydrin.

Example 9

A reaction mixture of 76.8 parts of the epoxide resin and 34.6 parts of 1,3-bis(p-hydroxycumyl)benzene is continuously stirred at temperature of 200° C. for 2 hours. The resulting terpolymeric resin is cured by the addition of 0.18 part of diethylenetriamine, followed by baking at a temperature of 95° C. for a period of 30 minutes. The terpolymeric resin, like that formed using 1,4-bis(p-hydroxycumyl)benzene as modifying agent, possesses superior chemical and physical properties as compared to terpolymeric resins prepared by reacting bisphenol-A with the epoxide resin.

TABLE V

| Example | Physical Properties | | | | Chemical Properties | | | | |
|---|---|---|---|---|---|---|---|---|---|
| | Mol Ratio of Resin to Bisphenol | Impact Test, inch-lbs. | Mandrel Test | Tape Test | Rocker Hardness | 10% Acetic Acid | 5% NaOH | Water | Plasticizer Added |
| 1 | 1:1.7 | 28 | Passed | Passed | 63 | No effect | Slight blistering | No effect | None. |
| 2 | 1:2 | Must be plasticized to pass. | Only slight cracking. | do | 80 | do | No effect | do | Do. |
| 3 | 1:2 | 20 | Slight cracking. | do | 74 | do | do | do | 20% beetle 216-8. |
| 4 | 1:2 | 28 | Passed | do | 74 | Slight staining. | do | do | Do. |
| 5 | 2:1 | 28 | do | do | 75 | do | do | do | Do. |
| 6 | 1:5 | 28 | do | do | 50 | Slight brownness. | Slight whitening. | do | None. |
| 7 | 1:2 | Failed | Failed | do | 34 | No effect | Readily attacked. | do | 20% beetle 216-8. |
| 8 | 1:5 | do | do | do | 52 | Readily attacked. | do | do | None. |

The above Impact Test and Rocker hardness tests are described in "Organic Coating Technology," J. Wiley & Sons, pages 642–647 (1959). The Mandrel Test is described in the American Society for Testing Materials Manual, Test D–522. The tape test was determined by making a V-shaped cut in the film, pressing a strip of cellophane tape over the V and abruptly ripping away the tape, followed by examination of the cellophane tape for any film adherence. The chemical properties of inertness to the above recited solutions were made on films having a thickness of 2.5 mils and employing a contact-time period of 24 hours. Beetle 216–8 is a plasticizer comprising urea-formaldehyde resin.

It should be noted that the above data clearly indicate the superior chemical and physical properties possessed by the terpolymeric resin obtained by the reaction of the epoxide resin and 1,4-bis(p-hydroxycumyl)benzene. More specifically, the terpolymeric resin of Example 3 prepared from 1,4-bis(p-hydroxycumyl)benzene had a Rocker hardness of 74 and passed the Impact and Mandrel Tests while the resin of Example 7 prepared from bisphenol-A failed both tests and possessed a Rocker hardness of only 34. The terpolymeric resin of Example 3 was completely chemically inert while the resin of Example 7 prepared from bisphenol-A was readily attacked by a 5 percent by weight solution of sodium hydroxide.

Comparing Examples 6 and 8 the terpolymeric resin prepared from 1,4-bis(p-hydroxycumyl)benzene passed the Mandrel Test and possessed an impact resistance of 28 inch pounds as compared to the failure of the resin prepared from bisphenol-A. Although, both resins possessed similar hardness, the resin prepared from bisphenol-A was readily attacked by solutions of 10 percent by weight acetic acid and 5 percent by weight sodium hydroxide.

The following example illustrates the preparation of a terpolymeric resin by reacting 1,3-bis(p-hydroxycumyl)

It is to be understood that the foregoing is by way of illustration and that changes and modifications may be made within the scope of the appended claims without departing from the spirit of the invention.

We claim:
1. Terpolymeric resins obtained by reaction of a bisphenol of the group consisting of 1,4-bis(p-hydroxycumyl)benzene and 1,3-bis(p-hydroxycumyl)benzene and an epoxide resin prepared from 2,2-bis(p-hydroxyphenyl)propane and epichlorohydrin.

2. Terpolymeric resins obtained by reaction of 1,4-bis(p-hydroxycumyl)benzene and an epoxide resin prepared from 2,2-bis(p-hydroxyphenyl)propane and epichlorohydrin.

3. Terpolymeric resins obtained by reaction of 1,3-bis(p-hydroxycumyl)benzene and an epoxide resin prepared from 2,2-bis(p-hydroxyphenyl)propane and epichlorohydrin.

4. A process for the production of terpolymeric resins which comprises heating a reaction mixture comprising a bisphenol of the group consisting of 1,4-bis(p-hydroxycumyl)benzene and 1,3-bis(p-hydroxycumyl)benzene and an epoxide resin prepared from 2,2-bis(p-hydroxyphenyl)propane and epichlorohydrin at temperature of about 150° to 250° C. and in a molar ratio of about 0.5 to 5 mols of said bisphenol per mol of said epoxide resin.

5. A process in accordance with claim 4 wherein the molar ratio of said bisphenol to the epoxide resin is about 0.5 to 2:1.

6. A process in accordance with claim 4 wherein the reaction temperature is about 180° to 220° C.

7. A process in accordance with claim 4 wherein the bisphenol is 1,4-bis(p-hydroxycumyl)benzene.

8. A process in accordance with claim 4 wherein the bisphenol is 1,3-bis(p-hydroxycumyl)benzene.

9. A terpolymeric resin obtained by reaction of about ½ to 5 mols of a bisphenol of the group consisting of 1,4-bis(p-hydroxycumyl)benzene and 1,3-bis(p-hydroxycumyl)benzene at a temperature of about 150–250° C. with one mol of an epoxide resin having a molecular weight from 340 to 2000 and consisting essentially of the condensation product of 2,2-bis(p-hydroxyphenyl)propane and epichlorohydrin.

10. A terpolymeric resin obtained by reaction of about ½ to 5 mols of 1,4-bis(p-hydroxycumyl)benzene at a temperature of about 150–250° C. with one mol of an epoxide resin having a molecular weight from 340 to 450 and consisting essentially of the product of condensation by dehydrohalogenation of 2,2-bis(p-hydroxyphenyl)propane and epichlorohydrin in a ratio of 20 to 5 mols epichlorohydrin per mol 2,2-bis(p-hydroxyphenyl)propane.

11. A terpolymeric resin obtained by reaction of about ½ mol of 1,3-bis(p-hydroxycumyl)benzene at a temperature of about 150–250° C. with one mol of an epoxide resin having a molecular weight from 340 to 450 and consisting essentially of the product of condensation by dehydrohalogenation of 2,2-bis(p-hydroxyphenyl)propane and epichlorohydrin in a ratio of 20 to 5 mols epichlorohydrin per mol 2,2-bis(p-hydroxyphenyl)propane.

12. A thermoset resin prepared by curing the terpolymeric resin of claim 9 in the presence of a poly-functional curing agent.

13. A thermoset resin prepared by curing the terpolymeric resin of claim 10 in the presence of a poly-functional curing agent.

14. A thermoset resin prepared by curing the terpolymeric resin of claim 11 in the presence of a poly-functional curing agent.

References Cited by the Examiner

UNITED STATES PATENTS

| 2,506,486 | 5/1950 | Bender et al. | 260—47 |
| 2,602,075 | 7/1952 | Carpenter | 260—47 |
| 2,634,297 | 4/1953 | Moyle | 260—619 |
| 2,865,887 | 12/1958 | MacKenzie | 260—47 |
| 2,986,550 | 5/1961 | Davis et al. | 260—619 |

FOREIGN PATENTS

| 932,811 | 7/1963 | Great Britain. |
| 1,293,289 | 4/1962 | France. |

WILLIAM H. SHORT, *Primary Examiner.*

J. C. MARTIN, *Assistant Examiner.*